Nov. 7, 1967     G. T. MURPHY     3,351,122
CAR DOOR BARRICADE
Filed April 1, 1964     5 Sheets-Sheet 1
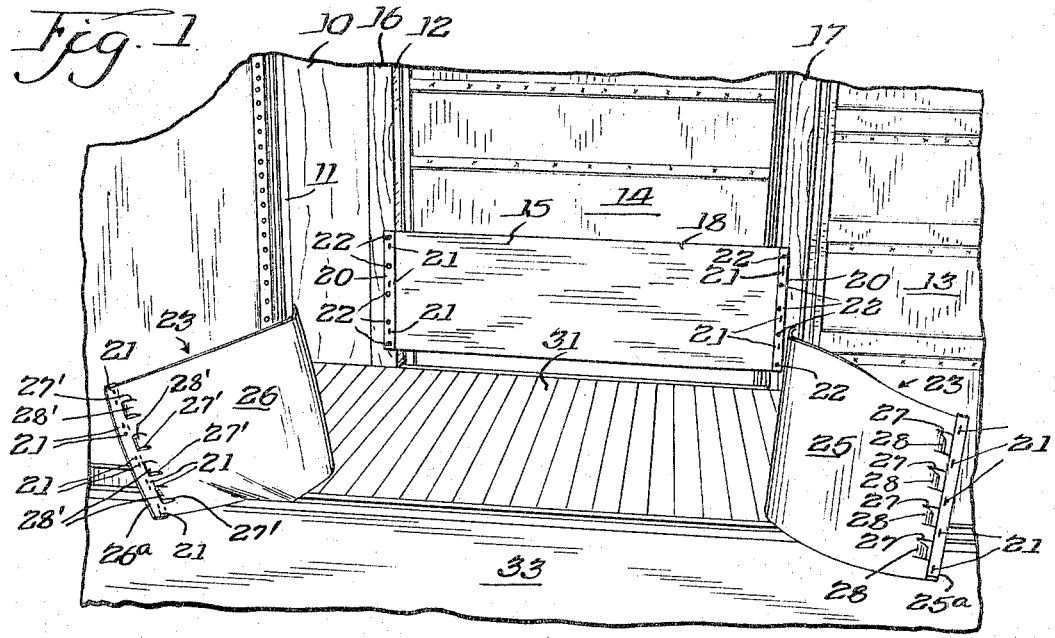
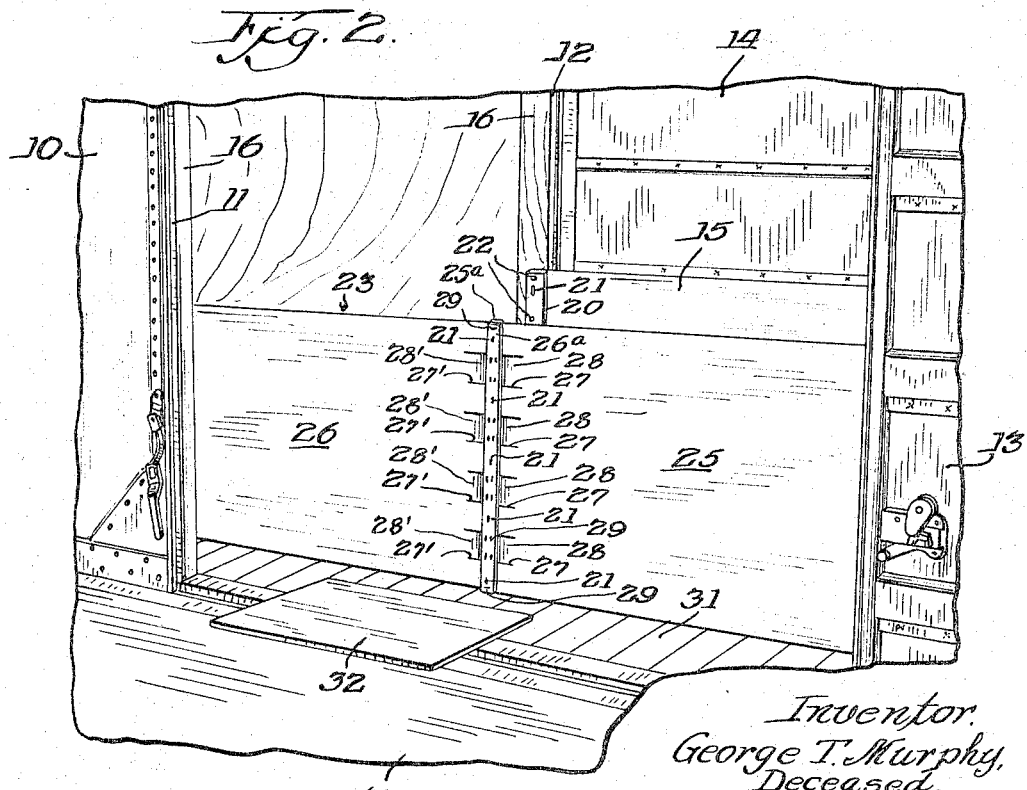
Inventor.
George T. Murphy,
Deceased,
Irene M. Murphy,
Executrix.
By Lee & Lee Attys.

Nov. 7, 1967 — G. T. MURPHY — 3,351,122
CAR DOOR BARRICADE
Filed April 1, 1964 — 5 Sheets-Sheet 2

Inventor.
George T. Murphy, Deceased,
Irene M. Murphy, Executrix.
By S. Lee & S. Lee, Attys.

Nov. 7, 1967  G. T. MURPHY  3,351,122
CAR DOOR BARRICADE
Filed April 1, 1964  5 Sheets-Sheet 3
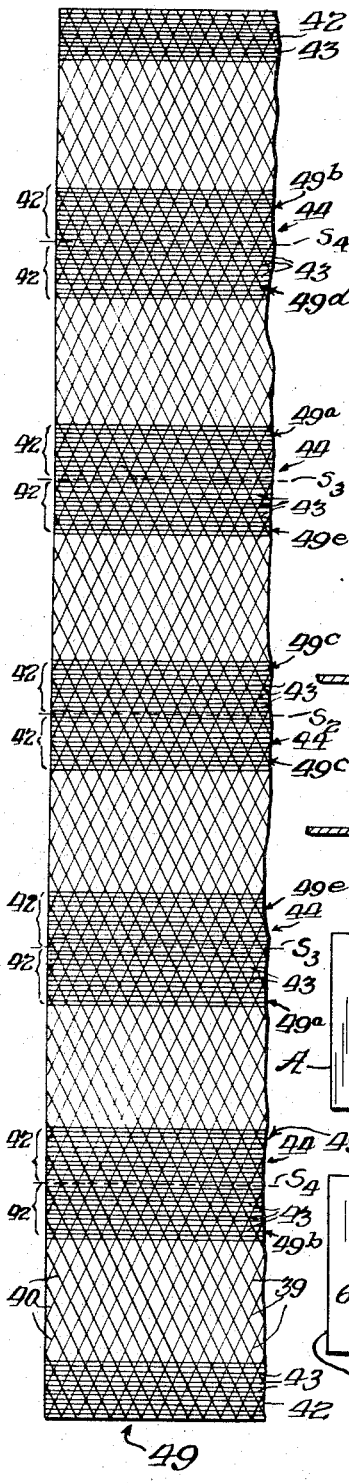
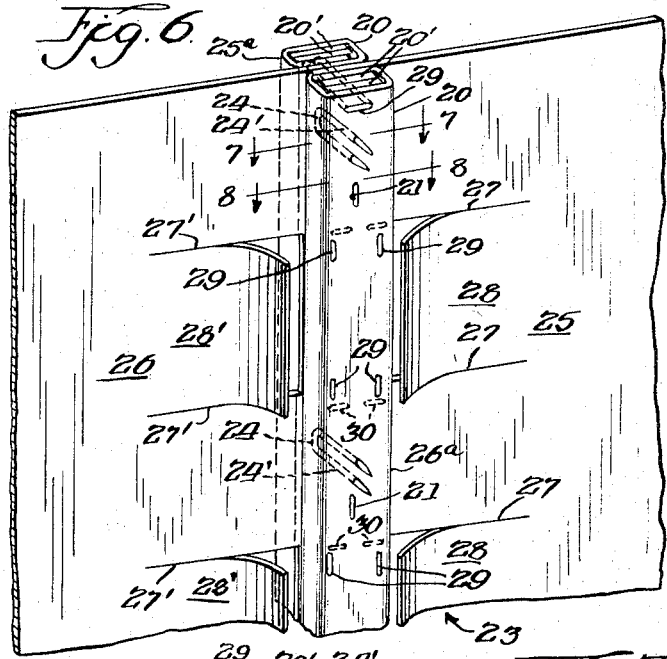
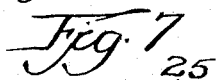
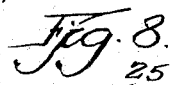
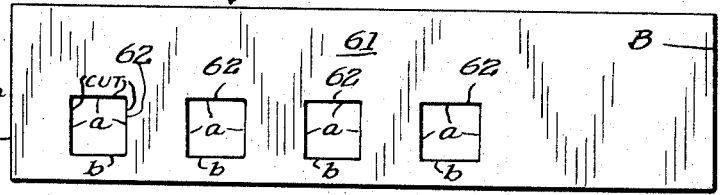
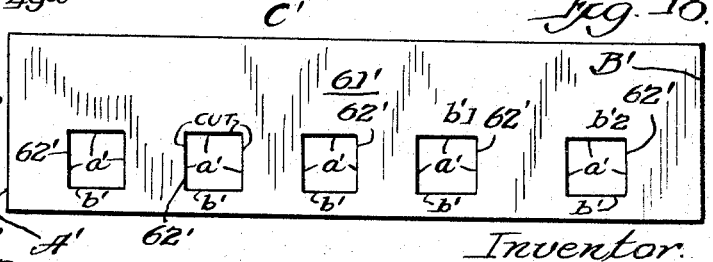
Inventor.
George T. Murphy, Deceased,
Irene M. Murphy, Executrix.
By Lee & Lee Attys.

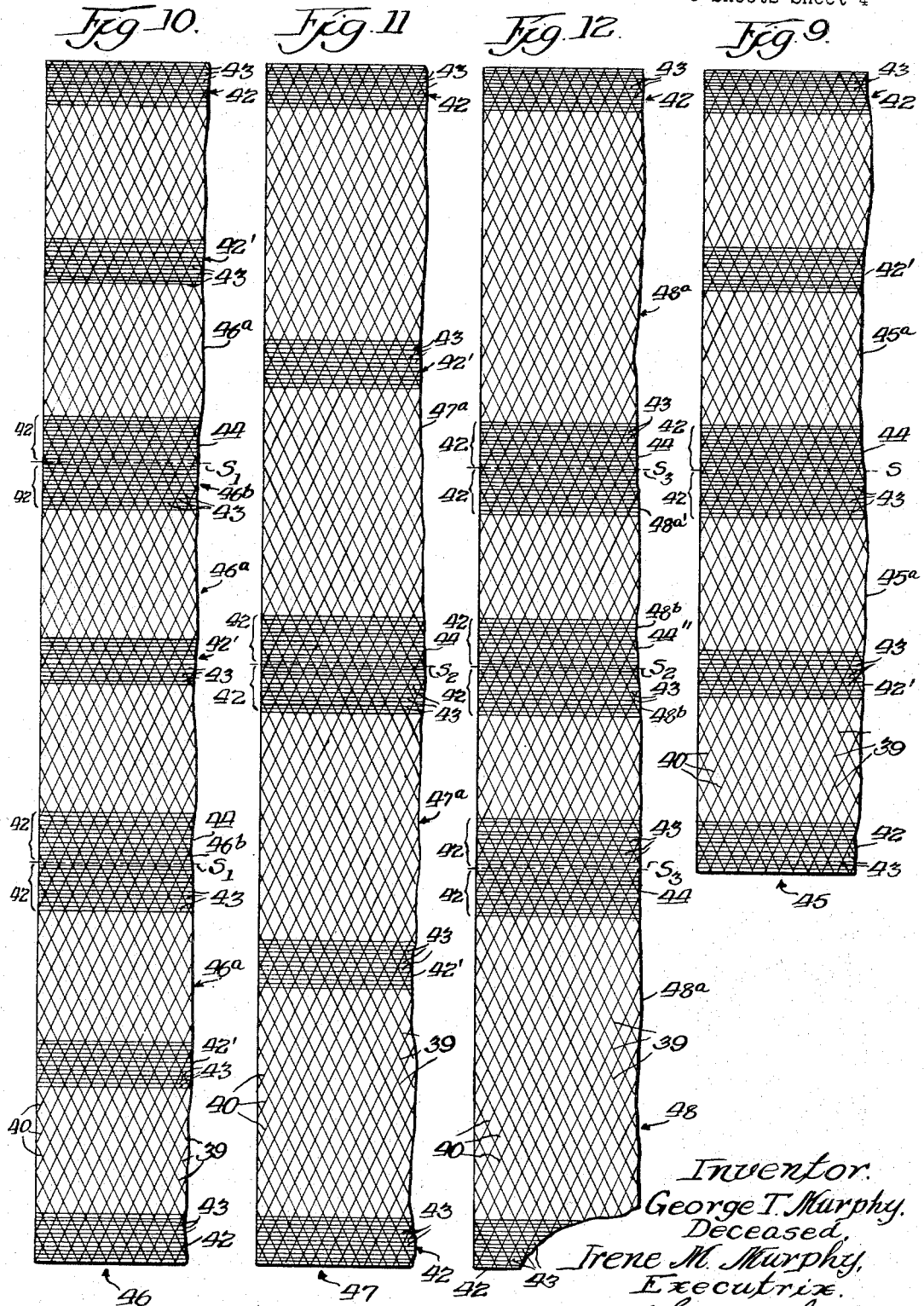

Nov. 7, 1967  G. T. MURPHY  3,351,122
CAR DOOR BARRICADE
Filed April 1, 1964  5 Sheets-Sheet 5

Inventor.
George T. Murphy.
Deceased
Irene M. Murphy.
Executrix.
By

United States Patent Office 3,351,122
Patented Nov. 7, 1967

3,351,122
CAR DOOR BARRICADE
George T. Murphy, deceased, late of Waukegan, Ill., by Irene M. Murphy, executrix, 312 Grand Ave., Waukegan, Ill. 60085
Filed Apr. 1, 1964, Ser. No. 356,674
13 Claims. (160—368)

This invention relates generally to closure structures for railway cars and the like, and more particularly to a novel barricade and/or carloading retaining strip and especially to a novel divided barricade and method of affixing the separate sections of the divided barricade together during manufacture and the installation thereof in a railway car door, and the carloading retaining strip and/or barricade of this invention is an improvement over my earlier patent for carloading retaining strip and lock therefor filed June 24, 1954, and granted as U.S. Patent No. 2,890,747 on June 16, 1959.

The present invention is directed to a closure construction for use on car doors and the like wherein the closure structure comprises suitable sheets of high strength, sheet-like material which are extended across the respective doorways at opposite sides of a railway car for use in the shipment of packages, and are primarily for the prevention of damage to the lading or package commodities from sliding in transit against the car doors because of lateral movement of packages in shipment if they should become displaced through the car movement. The sheet-like material of this invention is believed to be an improvement over the form of sheet material as disclosed in the abovementioned Patent 2,890,747 of mine, and also the sheet-like material of my wood grain door backer of my U.S. Patent 3,087,536 granted Apr. 30, 1963 and filed Jan. 24, 1955. The laminated reinforced sheet-like material of this invention is also considered an improvement over the glass strand reinforced paper of H. C. Crandall, 2,653,090 granted Sept. 22, 1953, and a more recent patent of H. C. Crandall 2,699,389 granted Jan. 11, 1955. The sheet-like material of this invention is also believed to be an improvement over that as disclosed and claimed in the grain door for railway cars of Gerrard et al., U.S. Patent No. 2,803,299 granted Aug. 20, 1957 and set forth in my above-identified U.S. Patent 2,890,747, and also an improvement over the improved form of material which was also described in my aforesaid Patent 2,890,747, wherein the material was felted from a suitable high strength paper slurry directly to both sides of a scrim of glass fibers having longitudinally and transversely extending strands of glass fibers of the type, for example, as disclosed in H. C. Crandall 2,699,389 granted Jan. 11, 1955.

The present invention has among its objects the production of a carloading retaining strip and/or barricade and divided barricade for use in coopering a freight car which may be completely placed across one of the doors, and a separable retaining strip or divided barricade which is used for the doorway of the car by which the car is loaded and unloaded.

Another object of the invention is to provide a retaining strip structure and/or barricade for partially closing oppositely disposed doorways of a freight car, one of which extends completely across a respective doorway while the other is separable intermediate the car door structure.

Still another object of the invention is to provide a retaining strip structure formed from relatively flexible laminated sheet material comprising a pair of outer plies and an inner ply of "Woven" and/or crossed strands of glass fiber in the form of a diamond-shaped mesh, together with an overlay of longitudinally extending machine length fibers in bands of strands of a predetermined number and arrangement across the width of the sheet material so that at either edge of the sheet material there is a predetermined number of strands along with the predetermined arrangement intermediate the edges of the sheet material, and the inner ply embedded in an asphalt coating and adapted to be secured contiguous its side edges to the doorway of a freight car or other vehicle used in the transfer of packaged commodities.

Still another object of the invention is to provide a pair of relatively rigid strips for each end of said retaining strips and/or barricades about which the respective side edge portions of the retaining strip and/or barricade structure are wrapped together with means for securing each of said sheets to the respective side strips.

Another object of the invention is to provide a retaining strip and/or barricade sttructure to permit the rolling thereof upon a rigid strip for the end of said structure to reduce or increase the effective width of the retaining strip structure to permit the rigid strips to be operatively secured to doorways of lesser or greater widths.

Still another object of the invention is to provide improved forms of securing means operatively affixed to contiguous edges of separable retaining strips for detachably securing the separable retaining strips together while the retaining strip and/or barricade is being erected and which may be suitably affixed together by a tool in the form of a clinching stapler which may be inserted through oppositely arranged openings contiguous to the substantially rigid strips of the separable ends of the divided barricade being affixed together by stapling.

Another object of the invention is to provide an improved form of sheet-like material for fabricating flexible closure structures for railway car door openings or other bulk loading openings, and also for partitioning the interior of railway cars for separating packaged material of different kinds and to limit longitudinal movement of packaged material within a railway car for the prevention of damage to the lading or packaged commodities from sliding longitudinally in transit.

A still further object is to provide an improved retaining strip and/or barricade for packaged car load shipments which will give protection so that there may be had solid doorway loadings of packaged products, such as cartons, bags, boxes and other forms of packaged products without damage to the car door or packaged products.

Still another object of the invention is to provide retaining strips and/or barricades for doorway loading without requiring the use of liners across doorways, and also to reduce dunnage since it is not necessary to rely on heavy doorway barricades and the like.

A still further object is to provide a retaining strip and/or barricade which permits the railway car door to be readily opened, and after the door is opened, to provide quick unloading since the retaining strips and/or barricades may be readily separated by severing or if necessary the staples used for affixing the divided barricades together removed.

Still another object of the invention is to provide a retaining strip and/or barricade which may be readily fitted to any standard railway car door, and which is simple to apply with ordinary hammer and nails and a divided barricade readily separated manually and affixed together with a conventional type of manually actuated staplers.

A further object of the invention is to provide a closure structure which is disposable and is substantially injury-proof to personnel handling erection of the closure structure and the detachment thereof from the car doorway of the railway car beinf unloaded.

A particular feature of the invention is to provide a retaining strip, barricade or flexible closure structure for railway car doors and the like fabricated from one or more sheets of preferably laminated sheet material with a crossed diagonal or diamond mesh within a predetermined diagonal fiber spacing of glass fibers and an overlay of longitudinally extending machine length glass fibers arranged in bands of longitudinally extending machine length glass fibers within predetermined spacings and with a band of longitudinally extending machine length glass fibers at each edge of the sheet material and with the intermediate bands so arranged that the sheet material may be fabricated in one or more widths of a predetermined size of retaining strip, and the retaining strip may include a diagonal or diamond-shaped mesh and an overlay of longitudinally extending machine length glass fibers arranged as set forth above as the sheet material is felted from a paper slurry simultaneously on opposite sides of the diamond mesh and overlay of longitudinally extending machine length glass fibers arranged in a predetermined pattern as the sheet material is being felted from a paper slurry.

Another feature of the invention is to provide a retaining strip, barricade or flexible closure structure for railway car doors and the like fabricated from one or more sheets of laminated sheet material with an intermediate "Fiberglas" scrim fabricated into a predetermined pattern of a diagonal or diamond-shaped mesh including an overlay of longitudinally extending machine length glass fibers arranged in bands at predetermined spacings permitting the sheet material to be severed in predetermined widths of the laminated sheet material for different widths of retaining strip or barricade in which each of the severed portions of the laminated sheet material has bands of an overlay of longitudinally extending machine length glass fibers at each edge of the severed sheet material.

Another feature of the invention is to provide a barricade and/or a retaining strip for a railway car door formed from separable portions secured together with securing means in the form of staples to permit the attachment of the assembled divided barricade to a car doorway and which may be detached permitting loading of the railway car after which the improved construction of the divided barricade permits the contiguous inner ends of the divided barricade to be affixed together by a clinched staple by a stapling machine inserted therethrough in slotted openings provided contiguous to the inner ends of the divided barricade, and in which the retaining strips are preferably mounted horizontally and may be abutted overlapped or spread apart depending on the weight and characteristics of the load.

Still another feature of the invention is to provide a securing means in the form of clinched staples which permits contiguous overlap and abutting wrapped edges of a retaining strip or barricade to be secured together, and which will not become opened by the movement of the car door and wherein the barricade may be readily severed or the clinched staples detached and the sections of the divided barricade separated at the destination in which unloading takes place.

Still another feature of the invention is to provide an improved carloading barricade or retaining strip, which may be formed from one or more strips of reinforced paper or the like material, depending upon the load of the packaged or bulk commodity retained by the car loading barricade and/or retaining strip.

In connection with the disclosure, dimensions will be indicated as a basis of relative proportions of the structures incorporating the invention as used on car doors of standard widths and represent dimensions which have proved particularly efficient for the purposes.

In indicating the weights of the laminated structures and the fiber contents, standard paper and fiber designations will be employed, in which, for example, the designation "140 lbs.—30 x 80 x 30" defines a laminated paper structure having a total base weight of 140 lbs. (weight of 1 ream of 500 sheets 2' x 3' or a total of 3000 sq. feet) in which the one outer paper sheet has a base weight of 30 lbs., the inner lamination of asphalt and glass fibers, a base weight of 80 lbs. and the opposite paper sheet a base weight of 30 lbs.

Likewise the designation of the fibers will be designated in the standard form of ends and strands in which, for example, the designation "75 ends 1/0" defines a single thread of 75 fibers. Similarly the term "150 ends 1/3" defines 1 thread of 3 strands, totalling 150 fibers.

In accomplishing the various objects and features of my invention, it is preferred to use a material for the car loading barricade and/or retaining strip of relatively flexible sheet material comprising a kraft reinforcing paper with a "Woven" and/or crossed diagonal and/or diamond-shaped mesh substantially within the diagonal diamond fiber spacing ¾" x 1", 1" x 1", 1" x 2", 1" x 3", and 1" x 4" of glass fibers—within the range of substantially 37 ends 1/0 and 150 ends 1/0 and an overlay of longitudinally extending machine length glass fibers within the range of from substantially 75 ends 1/0 and 150 ends 1/0, said reinforcing paper being laminated with asphalt and the glass fibers embedded therein.

The high strength flexible sheet material is cut to the preferred size for carload retaining and/or barricade strips or grain door or other bulk car door structures, and have the opposite ends wrapped about a suitable reinforcing member, one end of which may be affixed to the car door and if the material is used for carloading barricades and/or retaining strips, then the contiguous edges are affixed together with suitable clinched stapling means extending through the reinforced edges of the strip as formed by wrapping an edge about a suitable vertical member of chip-board or other material. The latching means in the form of clinched staples will be more particularly described later and are of such strength that when the overlying abutted edges of the contiguous edges of the divided barricade are affixed together, a continuous barricade is formed from the divided barricade of substantially the same strength as a corresponding single barricade when assembled across a car doorway. If it is desired to have a carloading retaining strip and/or barricade for packaged commodities or bulk commodities, such as grain and chemical material which require greater retaining strength than that provided by one strip of fabricated sheet-like material, it is within the scope of the invention to use 1, 2, 3 or more strips depending upon the load to be retained across an open car door area. It is also within the scope of the invention to provide not only the separable carloading retaining strips and/or divided barricades for bulk commodities but also a separable form of retaining strip for bulk commodities as well as a form of retaining strip and/or barricade for bulk commodities, such as grain products and malt, chemicals and minerals, and in which the pressure of the bulk material is restrained by cross ties connecting the opposite supporting door structures placed in the car door opening.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

FIG. 1 is a perspective view of carloading retaining strips and/or barricades applied to opposite railway car door openings and in which the divided barricade is separated to permit loading of the railway car with packaged commodities;

FIG. 2 is a perspective view of the railway car of FIG. 1 with the divided barricade affixed together after the railway car has been loaded with the packaged commodity;

Figure 14:
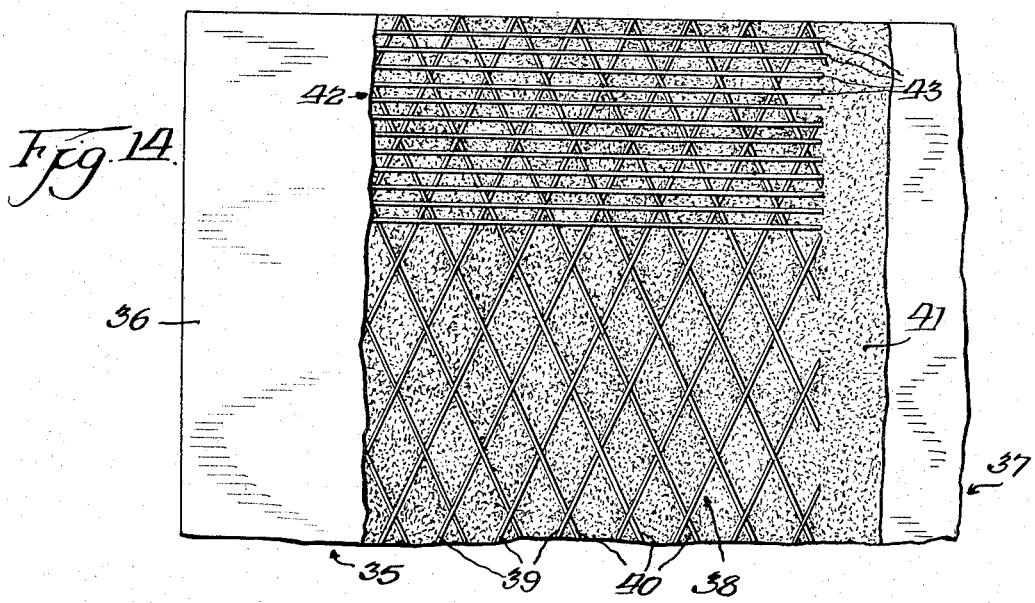
Figure 15:
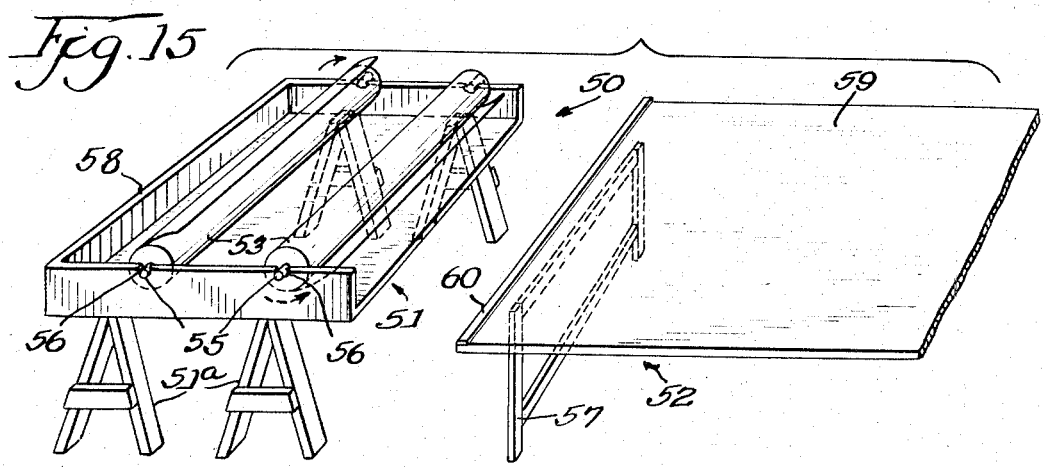
Figure 16:
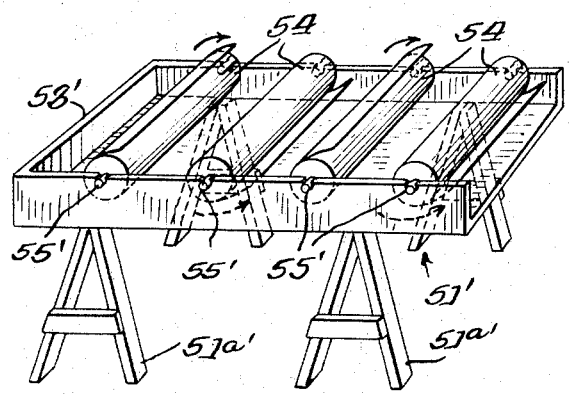

FIG. 6 is a partial perspective view in elevation illustrating the separable connection at the intermediate ends of a divided barricade and/or carload retaining strip and also the securing means for affixing the intermediate ends of the barricade after the railway car has been loaded, and further illustrating the slotted openings at the intermediate ends of the divided barricade through which a clinching stapler is inserted for affixing staples through the wrapped ends of each retaining strip of the divided barricade;

FIG. 7 is an enlarged sectional view partly in cross-section taken along line 7—7, looking in the direction of the arrows illustrating the stapling for the separation of the divided barricade, as assembled prior to the separation for loading the railway car;

FIG. 8 is an enlarged cross-sectional view, partly in elevation, taken along line 8—8, looking in the direction of the arrows, and illustrating the stapling of each wrapped end of the intermediate ends of the divided barricade, and the stapling together of the intermediate ends of the divided barricade, after the railway car has been loaded;

FIG. 9 illustrates schematically the diagonal and/or diamond-shaped mesh of glass fibers and an overlay of longitudinally extending machine length glass fibers permitting the flexible sheet material to be divided, for example, into two 24" barricades or one 48" barricade;

FIG. 10 is a schematic diagram of the diagonal and/or diamond-shaped mesh of glass fibers and overlay of longitudinally extending machine length glass fibers which is laminated between sheets of kraft paper for a flexible sheet material which may be divided, for example, into two 36" high barricades or one 72" barricade;

FIG. 11 is a schematic diagram of the diagonal and/or diamond-shaped mesh and overlay of longitudinally extending machine length fibers laminated between kraft reinforcing paper providing flexible sheet material adapted to be divided, for example, into two 36" high barricades or one 72" barricade;

FIG. 12 is a schematic diagram of the diagonal and/or diamond-shaped mesh of glass fibers and an overlay of longitudinally extending machine length glass fibers laminated between kraft reinforcing paper providing a flexible sheet material adapted to be formed, for example, into three 24" barricades, two 36" barricades, one 4' and one 24" barricade, and also one 72" barricade;

FIG. 13 is a schematic view of "Woven" diagonal and/or crossed diamond mesh and an overlay of longitudinally extending machine length fibers laminated between kraft reinforcing paper providing flexible sheet material adapted, for example, for slitting a 6' sheet thereof into three 24" barricades, two 36" barricades, one 48" and one 24" barricade, one 5' and one 1' barricade, and one 7' barricade;

FIG. 14 is an enlarged view partly broken away illustrating a "Woven" and/or crossed diagonal mesh and/or diamond-shaped mesh of glass fiber and an overlay at one edge of longitudinally extending machine length glass fibers laminated with asphalt in which the diamond-shaped mesh and overlay are embedded and within a coating of asphalt applied to one reinforcing sheet and in which the glass fibers are embedded and the other reinforcing sheet laminated thereto under pressure with an embossing roll to provide a relatively flexible sheet material for retaining the strip material and/or barricade;

FIG. 15 is a schematic illustration of apparatus in the form of a rack for supporting two rolls of flexible paper, for example, 4' or 6' wide and a supporting table for cutting simultaneously two sheets of the flexible sheet material into retaining strips and/or barricades and for fabricating the completed retaining strip and/or barricade;

FIG. 16 is a schematic view of apparatus in the form of a rack similar to the rack of FIG. 15 but for supporting four rolls of flexible sheet material in, for example, 2' or 3' widths in conjunction with the supporting table for cutting the flexible sheet material into lengths of retaining strip and/or barricade and the fabrication thereof;

FIG. 17 is a plan view of a fiber board jig with four square openings for use in fabricating the slotted openings in, for example, 3', 4' and 6' divided barricades; and FIG. 18 is a plan view of a fiber board jig formed with five square openings for, for example, cutting slots for, for example, 2', 3', 4' and 6' barricades.

Referring to FIGS. 1 through 8, a preferred form of carloading retaining strip and/or barricade and securing means therefor for affixing together the contiguous portions of a divided barricade will be described. A conventional railway car construction 10 having opposite doorways 11 and 12 adapted to be closed by doors 13 and 14, which for the purpose of disclosure of this invention, the opening 12 shall be considered as being closed by the door 13, and either the loading or unloading of the car shall take place through the opening 11, after which the sliding car door 13 therefor will be closed upon completion of the loading. In applying the carloading retaining strips and/or barricades for packaged commodities, it is preferred to first apply a retaining strip of laminated construction 15 which extends across the opening 12 formed by the vertical parts or jambs 16 and 17. Although the carloading strip and/or barricade of this invention may be formed from a single fabricated member 18 of sheet-like material, the barricade may also be formed from multiple layers of two or more strips as illustrated in my aforementioned Patent 2,890,747 of June 16, 1959. It is also within the scope of the invention that the number of plies used depends upon the lateral force of the packaged commodities set up in transit or lateral force of bulk commodities to be restrained at the doorway of a railway car. As the width of railway car doors varies from six to eight feet, it is preferred to fabricate the length of the sheet 18 such that one size will do for the various widths of car door openings. However, if necessary the length of the sheets may be adjusted to take a certain range of door sizes, and another size retaining strip may be utilized for the balance of the range of car door widths.

It is within the scope of my invention that the fiberglass reinforced car doorway strip and/or barricade may be tailored for every job in all size car doors from 6' to 15' wide and including the normal range from 6' to 8'. Standard heights of the fiberglass reinforced car doorway strips and/or barricades may be 2, 3, 4, 5 and 6' and additional heights may be fabricated in accordance with the disclosure of my invention. In order to wrap the retaining strip or multiple strips, if used, at the ends for securing the ends of the retaining strip or strips to the jambs of the doorway, two pieces of chip-board provide the chip-board nailing strip 20 about which the ends of the strip are wrapped as illustrated in FIG. 5 and also in FIGS. 5, 6, 7 and 8 with respect to the intermediate ends of a divided barricade to be described later. It is preferred to have at least a minimum of three plies of the sheet or sheets wrapped, as shown in FIGS. 1, 2, 3, 4 and more particularly illustrated in FIG. 5, and these may be affixed in place by staples 21. For the single car doorway barricade, each end of the sheet of paper if preferably folded twice over the two chip-boards 20 and stapled. The particular size of the cut length of paper for these sizes of barricades will be more particularly set forth with respect to the description of the fabrication. The retaining strip, as it is wrapped at the edges, is then erected to the door jambs by random nailing with suitable nails 22 or other form of securing means, such as staples applied with a stapling machine and the like. If the retaining strip is made for multiple widths of car doorways, the other end of the strip is then unwrapped to the point at which the proper width of the doorway is had, and the strip is then nailed in position. If, however, the retaining strip is made to the proper width of door to which it is applied, both ends of the retaining strip and/or barricade are wrapped as described with the left hand side of FIG. 5 and stapled with staples 21.

Figure 3:
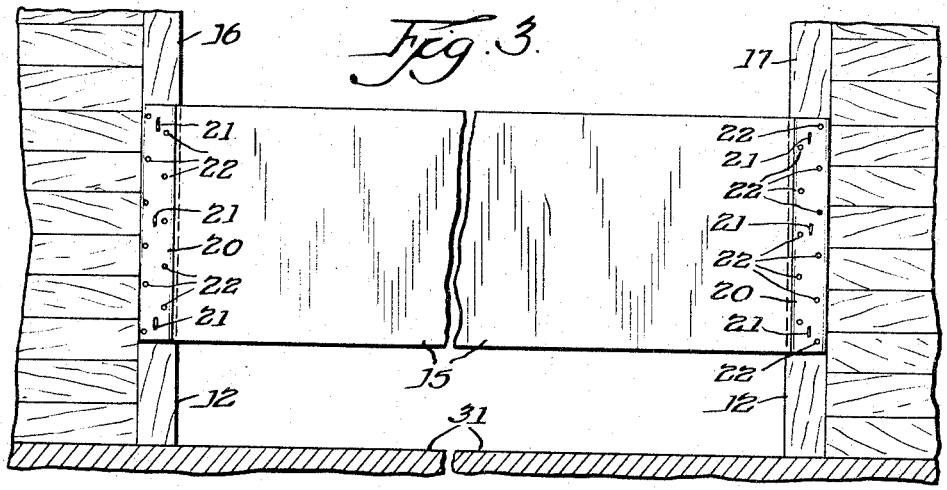
FIG. 3 is a vertical elevational view from within the railway car, illustrating a retaining strip and/or barricade as applied to one do or of a railway car.
Figure 4:
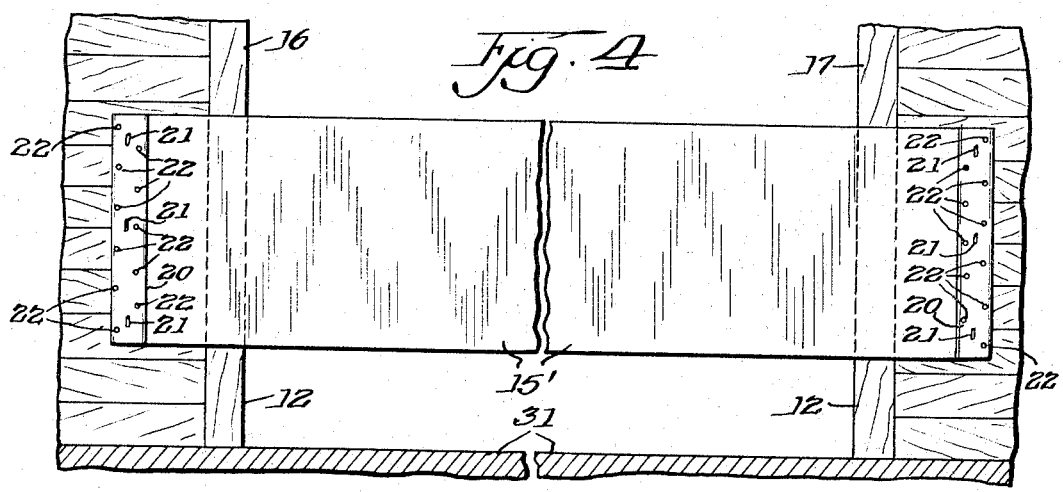
FIG. 4 is a vertical elevational view from within a railway car illustrating a retaining strip and/or barricade extending across a railway car door and in which the barricade is affixed to the side walls of the railway car door instead of to nailing strips of the car doorway which may be in a damaged condition.
Figure 5:
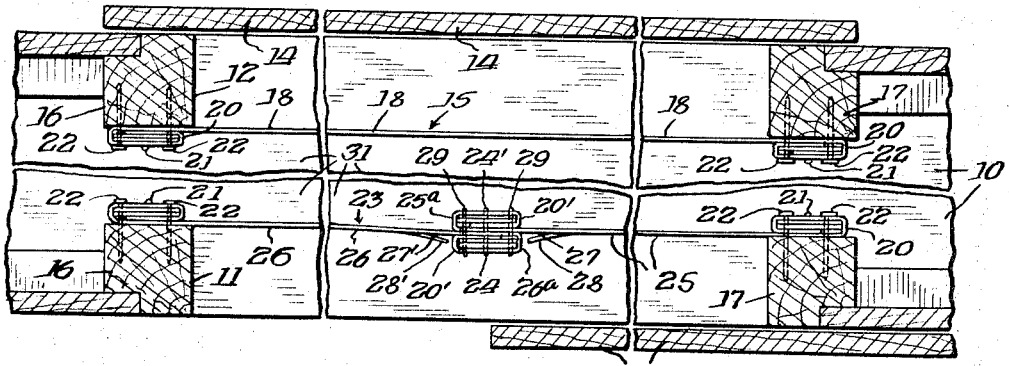
FIG. 5 is a plan view of carload retaining strips and/or barricades applied to opposite railway car door openings.

Referring to FIGS. 3 and 4 which illustrate schematically a single barricade directed to the door opening on the off side of the railway car from which the package lading is loaded, the one piece car doorway barricade or strips are installed on car door posts, FIG. 3, or side walls of FIG. 4, particularly when as in older railway cars, the car door posts have been damaged by excessive nailing thereto such that the nails will not hold and it is necessary to nail to the side walls as illustrated. When nailed to the side walls, it is necessary to use longer one piece car doorway barricades 15'. The barricade is installed on the car door posts 16 and 17 or side walls as illustrated in FIG. 4 as tightly as possible with the side stapled with the stencil "This Side In" to the inside of the railway car 10. The schematic nailing of FIGS. 1, 3 and 4 and FIG. 5 is schematic of random nailing, and may be illustrative of nailing where extra heavy packages are being shipped and wherein it is necessary to use more nails in each end. It is preferred when additional nailing is used to stagger the nails on the edges of the barricade as illustrated in FIGS. 3, 4 and 5. It is essential that the barricades are tightly nailed. These strips and/or barricades are completely disposable with no personal injury at either loading or unloading points especially where necessary safety precautions are taken by wearing safety glasses to prevent any inadvertent injury to the eyes of a workman in detaching the barricades and removing the nails in clearing away the disposable barricades.

Referring to FIGS. 1, 2 and 5, after the erection of the retaining strip or barricade 15 of one or more plies for the doorway 12, opposite the door 11 through which the commodities are loaded, the retaining strip structure or divided barricade 23 including temporary securing means 24 therefor is then applied after the packaged commodities are nearly loaded, or it may be applied prior to the completion of the loading with the separable portions 25 and 26 secured together as illustrated in FIG. 5 with the temporary securing means 24 in the form of staples 24', FIGS. 5, 6 and 7 which extend through the nailing strips 20 formed as the nailing strips 20 of the single car doorway barricade as described above with each end of the sheet of relatively flexible sheet material folded twice over two chip-boards 20' and stapled with the staples 21, FIG. 8, one every 12". The ends of the divided barricade 23 which correspond to the nailing strips 20 of the single barricade 15, FIGS. 1, 3 and 5 are made as the single barricade 15. These ends of the divided barricade are similarly suitably stapled on the ends and on the slot ends 25a and 26a. The slotted ends 25a and 26a are provided by folding the slot ends over chip-boards 20' similarly as described with respect to the ends of the single barricade and also over the ends of the divided barricade. One-half 25 of the divided barricade 23 is made as the single barricade 15 with respect to the forming of the nailing strip 20 and the slotted end 25a while the other half 26 of the divided barricade 23 has the slot end 26a folded over the chip-boards on the opposite side of the paper from the folded nailing strip 20 on its end. The slotted end 26a is similarly stapled as the slotted end 25a with staples 21, and as previously described above with regard to the single barricade 15. On the slotted end of the divided barricade the paper is stapled to the chipboards between slots 27 of the divided barricade 25 and the slots 27' of the divided barricade 26 with staples 21 as shown in FIGS. 1, 2, 5, 6, 7 and 8. In forming the slots 27 and 27', these are formed by cutting slits to form a U-shaped notch as will be described with reference to the jigs of FIGS. 17 and 18 which produce flaps 28 and 28' which provide the hand hole about 4" square for the insertion of a suitable clinching stapler for affixing staples 29. The temporary assembling of the halves 25 and 26 of the divided barricade 23, these two sections 25 and 26 are lightly stapled together in place back-to-back by the temporary stapling means 24 in the form of staples 24' of such a length that the staples 24' extend through nailing strips 20' but are not clinched thereover permitting the barricade sections 25 and 26 to be detached after the temporary assembled divided barricade 23 has been affixed to the respective door posts 16 and 17 of the doorway 11, FIG. 5 with the shingle nails 22.

The sizes of the divided barricades are similar to the length of the single car doorway barricade. The divided car doorway barricade strips 23 are stapled lightly together with the staples 24 as described above so that the divided barricade can be installed tightly on the car door posts 16 and 17 or on the side walls as described with reference to the single car doorway barricades of FIGS. 3 and 4 as a one piece strip using a suitable number of roofing nails.

If extra heavy packages are being shipped more nails may be used in each end. The divided barricades are nailed in position as tight as possible, after which the center ends 25a and 26a may be separated by pulling apart by hand as the staples 24' are not clinched. The center ends are positioned outside of the doorway as shown in FIG. 1. When the loading is completed, the center ends 25a and 26a are stapled together again with the staples 29 exactly as they were before separation. These center ends must be back-to-back as illustrated in FIG. 5. After the restapling, the divided barricade 23 will be as tight as when installed originally.

Referring to FIG. 2 and FIG. 6, it is preferred to use a minimum of four staples 29 in each opening forming a square pattern and in case of extra heavy packages, it is preferred to use four extra staples 30 in each hand hole, in the opposite direction. It is preferred also to staple the top and bottom ends together with one or more staples 29 as illustrated in FIG. 2. The barricades 15 and 23 are positioned above the floor 31 at each doorway 12 and 11, respectively, at a minimum distance being at a maximum less than 6" and such a vertical spacing that any of the packaged lading cannot slide underneath the bottom edge of the barricade.

Usually it is preferred to assemble the retaining strip 23 in position prior to loading since the barricades can be easily stepped over, and if it is desired to build additional doorway protection, depending upon the height of the packaged commodities, this may be done as the loading proceeds. However, it is usually preferred to erect retaining strips needed for the doorway, which is not opened at the beginning of the coopering. Preferably the divided barricade 23 is erected by the worker from the inside of the car and after it is erected in place, the barricade is separated as illustrated by the worker and positioned as illustrated in FIG. 1 to permit the car to be loaded by trucking in the packaged lading over the steel plate 32 extending across the opening between the loading dock 33 and resting on the car floor 31 as illustrated in FIG. 2. After the car is loaded and the divided barricade 23 assembled together as illustrated in FIG. 2, the plate 31 is removed and the door 13 closed and locked and sealed.

The retaining structure or barricade 23 is illustrated as being formed of a single ply sheet-like material so it is within the scope of the invention that one or more plies may be used for each portion of the completed retaining strip structure, as described above with respect to the unopened doorway and particularly disclosed in my aforementioned U.S. Patent 2,890,747. Since it is desired to provide a divided barricade which may be formed of separable portions 25 and 26 and may be readily separated by detaching the staples 29 with a suitable staple puller or the divided barricade cut apart with a knife of the type of a linoleum cutting knife. Also whereas, the railway car is usually loaded through the divided barricade 23, the packaged lading may be removed from the opposite sides so it is necessary to either cut the single barricade apart or it is also possible to detach the nailing strip at one edge after the car door has been opened of either the single or divided barricade permitting the barricade to be pulled outside of the car and the lading unloaded. Whatever manner is used to open up the barricades, the barricades are fully disposable.

In describing the single barricade and the divided barricade, and as the free ends of the portions 25 and 26 which are affixed to their respective door jambs 17 and 16 are the same as described with reference to the retaining strip or barricade for the unopened doorway 12, like reference characters have been used to identify the same or similar parts. As described above, the barricade has been formed of separable portions 25 and 26 and may be readily separated by a suitable staple remover for detaching the staples 29 as well as the staples 30 if additional staples are found necessary and the top and bottom staples 29, as shown in FIG. 2, it is also within the scope of the invention that as these doors are disposable, both the single and double barricades may be opened by slashing with a suitable cutting tool. However, for the purpose of economy sometimes it may be desirious to reclaim these disposable doors which may be done as set out above. Also if it is desirable to reclaim both the single and double barricades where possible, it may also be found necessary to provide sufficient rigid edges for the contiguous ends of the respective portions 25 and 26 as well as similar edges of the single barricades 15. If this is desirable, this may be accomplished by wrapping each edge of the divided portions 25 and 26 as well as the single barricade about a suitable plywood strip instead of the chip-board nailing strips and similar securing strips at the intermedate ends of the divided barricade. If plywood strips are used, the length thereof would correspond to the height of the various sizes of retaining strips or barricades. Similarly the wrapped plies of the retaining strip portions are affixed to the plywood strip by staples 21 in a similar manner as are the strips for the outer ends of the retaining strip portion as has been described with respect to the chip-board strips.

It is also within the scope of this invention that the barricades as constructed with reference to FIGS. 1 and 2, may be overlapped or spaced apart, depending upon the weight and characteristics of the packaged carload shipment. This has been particularly disclosed and claimed in my aforementioned U.S. Patent 2,890,747 and further description is believed unnecessary. Since, as described with reference to FIGS. 1 and 2, the lower barricades have been erected and the upper barricades when desired may be similarly erected. Similarly the barricades when erected in an overlapped or spaced-apart relationship may be detached by removing the nails 22, and if care is used in salvaging, even the barricade portions may be reclaimed if they have not been pierced in any manner during shipment. Although it is preferred to use single-headed nails as illustrated for the erection of barricades in single heights or multiple heights, if the type of shipment permits the use of double-headed nails, it is within the scope of the invention that double-headed nails may be used but there is a tendency with double-headed nails to cause damage to the cartons of the packaged shipments.

Referring to FIGS. 1 and 2, when the single and divided railway car doors or barricades are fabricated to be used at the place of loading the shipment, it is preferred that the portions 25 and 26 of the completed divided barricade 23 shall be assembled complete with the temporary securing means 24 in the form of staples 24' in place, and so rolled that a neat and compact bundle is had, together with the opposite retaining strip 15 which is for the opposite doorway at which the loading and unloading takes place. It is also within the scope of the invention that if the shipper requires separable barricades for each doorway, these may be furnished. Usually, however, it is designated which door of the car is to be used for loading and unloading. Usually in the fabrication, quantities according to order are rolled, wrapped with a narrow band used as a snub, then the barricades are covered by kraft fiberglass paper, sealed and labeled for shipment. It is preferred, however, as described above, to erect the securing means 24 in the form of staples 24' in position, after which they are bundled for shipment, or, if desired, the divided barricades may be shipped separately, after which they can be assembled as described on the job with the securing means 24, and then the assembled strip 23 with the staples 24' in position erected across the car doorway as described above.

Referring to FIGS. 9, 10, 11, 12, 13 and 14, there is illustrated several embodiments of the relatively flexible sheet material of reinforced paper from which it is preferred to fabricate the retaining strips and/or barricades in different heights and lengths. It is preferred to provide this improved form of barricade from a glass strand reinforced paper. In the embodiment to be described with respect to the various embodiments of the overlay of longitudinally extending machine length glass fibers permitting the relatively flexible sheet material to be fabricated from a predetermined width, e.g., 6' or 7' widths into 2', 4', 5', 6' or 7' high barricades so that substantially twelve strands at ¼" apart along each longitudinal edge of the different heights of barricades, it is preferred to use a kraft sheet of substantially within the range of from 30 to 40 lbs. per ream weight when based on 500 sheets of paper 24" x 36", and when a heavier barricade is desired it is within the scope of the invention to use a kraft sheet of substantially 170 lbs. per ream weight. With the heavier paper the thickness of the paper is preferably 0.023" or 23 point paper, and correspondingly thinner for the 30 lbs., 40 lbs., and 50 lbs. kraft paper which may also be used. Although it is preferred to use a kraft-type paper, a sheet 35 may also be fabricated from other forms of suitable material such as paper, cellophane or plastic sheets, though it is preferred to use kraft paper substantially within the range of 23 point plies or sheets 36 and 37 with the intermediate ply 38 constructed in the form of two series of "Woven" and/or crossed strands having a series of diagonal strands 39, and a series of additional diagonal strands 40 as shown in the enlarged view, FIG. 14, and in the schematic views of FIGS. 9–13. The crossed strands 39 and 40 provide a diagonal mesh and/or diamond-shaped mesh substantially within the diagonal fiber spacings ¾" x 1", 1" x 1", 1" x 2", 1" x 3", and 1" x 4" of glass fibers, the arrangement of spacing depending upon the strength of barricade desired if it was preferred to use a diagonal and/or diamond-shaped mesh of 1" x 1". The diagonal strands 39 and 40 are crossed with respect to each other at an angle of substantially within the range of from 60° to 65° with respect to each edge of the sheet material from which the barricade is formed. The strands 39 and 40 may be of any suitable material having the desired characteristics of flexibility, tensile strength, etc., to achieve the desired results. In the construction illustrated, the sheets 36 and 37 are secured together by suitable adhesive material 41, as for example, asphalt, a combination of asphalt and latex, suitable plastics and the like. It has been found that very satisfactory results may be obtained by constructing the strands 39 and 40 of glass fibers. The overlay of longitudinally extending machine length fibers providing a band 42 of twelve strands 43 of glass fibers. The bands of longitudinally extending machine length fibers as shown in the embodiments of FIGS. 9–13 are substantially the same including the bands 42 of twelve strands 43 each, and similar intermediate bands 42' of twelve strands 43, together with additional intermediate bands 44 of twenty-four strands 43'. The bands 44 of twenty-four strands permit the slitting of the flexible sheet material in 2', 3', 4', 5' barricade material from a standard 6' sheet which also provides a 6' high barricade. The flexible sheet material may be fabricated into 7' high barricades not shown, but which may be fabricated in accordance with the disclosure permitting the final sheets which may be slit therefrom and the largest sheet to have substantially twelve strands at each edge of the sheet material forming the barricade, together with the intermediate bands of twelve strands and/or twenty-four strands depending upon the size of barricade fabricated from the flexible sheet material. It is also within the scope of the invention that the intermediate ply of the diamond-shaped mesh and overlay of longitudinally extending machine length fibers may be fabricated into what is commonly known as scrim.

It is also within the scope of the invention that an embodiment of this form of material, FIG. 14, may be made by felting a suitable kraft pulp simultaneously to both sides of a "Fiberglas" scrim sheet having the arrangement of glass fibers as illustrated in connection with flexible sheet material having glass fiber arrangements of diagonal mesh and overlay of longitudinally extending machine length glass fibers of the arrangement of FIGS. 9, 10, 11, 12 and 13. Such a sheet may be simultaneously felted on such a scrim sheet having the arrangements as identified above on a suitable Fourdrinier or Oliver felting machine which has been modified so that the felting operation takes place simultaneously on both sides of such a glass scrim sheet of the embodiments of FIGS. 9–13 in accordance with the disclosure of my U.S. Patent 2,890,747. Also such a completed sheet material is an improvement over the glass strand reinforced paper fabricated in accordance with the disclosure and claims of Crandall U.S. No. 2,653,090 dated Sept. 22, 1952, as well as the patent to Crandall 2,699,389 of Jan. 11, 1955. When a scrim sheet is used, fabricated in accordance with the arrangement of the glass strands of FIGS. 9–13, such a scrim sheet may be treated in the same manner as the individual strands of fibers as disclosed in the aforementioned patents to Crandall. It is to be understood that the glass scrim identified as 150–1/0 would have less strength than if the scrim was identified 150–1/3–2/2 when woven with a fiber spacing of ½" rather than 1" for the diagonal strands. It is within the scope of the invention that the maximum weight of 170 lbs. bases for 3000 sq. ft. of paper fabricated in this manner has a scrim weight of substantially 38 lbs. with a pulp weight of substantially 132 lbs. The preferred range of weights, however, is within the range of 30 x 60 x 30, 40 x 70 x 40, and 50 x 70 x 50, the 50 x 70 x 50 corresponding to the 170 lb. bases for 3000 sq. ft. of paper as described above. It has been found that a scrim with the preferred spacing permits the paper fibers to pass through the screen-like scrim to properly embed and inter-entwine the horizontal fiber overlay and the diagonal strands of the scrim. It is also to be understood that any arrangement of fiber ends to produce a glass strand of a different number of fibers may be used as is well understood in the art. For example, 150 ends may be made into strands having multiples thereof, such as 300, 450, 600, etc., and inturn the spacing may be at any preferred conventional spacing when the strands are woven into scrim sheets. When scrim of the arrangement as set out above with respect to FIGS. 9–13 is used, it is preferred to use spacing of substantially ½" though when fabricated with respect to the machine of the type of "Weaver" it is preferred to use a 1" diagonal mesh though other diagonal arrangements of mesh may be used as set forth. It is also within the scope of the invention that the horizontal strands 43 may be of greater strength than the diagonal strands 39 and 40. The sheets from the felting machines, after they have been felted and calendered may be cut to the required width, e.g., 18" and/or 24", 36", 48", 60" and 72" for the retaining strips and/or barricade in lengths depending upon the car door width to which they are to be applied. If the completed sheets are to be used for a grain door construction, the sheets are then fabricated into the sizes required, depending upon whether the sheets are to be fabricated to extend completely across the doorway or of a predetermined size or of a size to fit a series of doorway openings. Likewise, it is to be understood if separable sheets are to be used, the narrower widths may be used. Material fabricated as described above with respect to the arrangement of the diagonal mesh and overlay of horizontal glass fibers is equally satisfactory for wood grain door backers as disclosed and claimed in my U.S. Patent 3,087,536 of Apr. 30, 1963.

Sheet-like material formed in accordance with the disclosure of the embodiments of FIG. 9–13 is substantially four or five times stronger than standard kraft paper. Usually, a single sheet of either the embodiment of these figures is suitable for fabricating a retaining strip, for a grain car door sheet or for a backup sheet for wood grain doors. However, as the widths of the door opening increase or the load to be retained exerts a greater lateral pressure it is within the scope of the invention to use multiples of the sheet for the barricades or retaining strips or for grain car door construction. As an example, where increased strength is desired, for the most part a maximum of three sheets may be required assembled into a barricade or portions thereof as illustrated in FIG. 5 for an 8' wide door, and the same would also preferably be required for grain car doors or the like which have loadings of over 80,000 pounds per car with an 8' wide doorway, and with the grain car door, likewise substantially 8' high as described in my earlier U.S. Patent 2,890,747.

Referring particularly to FIGS. 9–13 and also to FIG. 14, the embodiments of the relatively flexible sheet material which may be readily formed into 2', 3', 4', 5', and 6' high barricades by slitting at the spacing so that each flexible sheet for the respective height of barricade has formed on the longitudinal edges thereof bands 42 of twelve strands 43 of glass fibers because of the arrangement of the bands 44 having twenty-four strands 43 of glass fibers. Referring to FIG. 9 and FIG. 14, a 48" sheet 45 will form one 48" high barricade with an overlay of 72 longitudinally extending machine length glass fibers 43, and by slitting at the midpoint S, two 24" high barricades with an overlay of 36 longitudinally extending machine length glass fibers 43. The 48" barricade 45 and the two 24" barricades 45a will also have a preferred form of diagonal and/or diamond-shaped mesh wherein the diagonally laid strands 39 and 40 are arranged as particularly described with respect to FIG. 14 when these strands are spaced substantially 1" apart forming the diamond-shaped mesh arrangement as illustrated.

Referring to FIG. 9 the flexible sheet material 45 is formed with the overlay 42 and 42' symmetrically arranged 12" from each longitudinal edge of 12 strands 43 where the strands are ¼" apart and a center band 44 of 24 strands 43 spaced ¼" apart. The 1" diagonal mesh is preferably formed with strands of 75 ends—1/0, whereas the overlay of the strands 43 are preferably formed from 150 ends—1/0. The sheet 45 may be formed with a bases weight of 140 lbs.—30 x 80 x 30 though it is preferred to use a sheet with the 2 kraft sheets 36 and 37—40 lbs. each and the intermediate ply of adhesive and glass strands forming the horizontal overlay and the diagonal mesh of 80 lbs.

Referring to FIGS. 10 and 14, a relatively flexible sheet 46, 72" wide is illustrated similarly formed with the longitudinally extending bands 42 of spaced strands 43—¼" apart and symmetrically arranged bands 42' similarly formed as the bands 42 of glass reinforcing strands 43 spaced 12" from each edge, together with a center band 42'. Bands 44 are symmetrically positioned on 24" centers as illustrated. The 72" high sheet 46 may be fabricated into 2' high barricades 46a or one 4' high barricade 46b and one 24" high barricade 46a or one 72" high barricade 46. The 6' high barricade has 108 strands total, each 24" sheet 36 strands and each 48" sheet 72 strands as was described with reference to the sheet 45 of FIG. 9. Each 24" barricade is formed by slitting at $S_1$. Since the sheet 46 is symmetrical by slitting at $S_1$ a 48" barricade 46b may be formed from either edge of the sheet as well as one 24" barricade 46a, and three 2' barricades 46a may be formed by slitting along the slits $S_1$ from each end or using a slitting device which may simultaneously slit at two places $S_1$. The diagonal mesh formed by the diagonal strands 39 and 40 is arranged as described with respect to FIGS. 9 and 14. The diagonal mesh is formed with strands 39 and 40 having 75 ends 1/0. The overlay of the horizontal strands 43 formed in the bands 42, 42' and 44 are formed of 150 ends 1/0. A typical sheet 46 may have 140 lb. bases weight—30 x 80 x 30 where the kraft paper is 30 lbs. bases weight and the diagonal mesh and horizontal overlay, together with the asphalt in which the strands are embedded weigh substantially 80 lbs. It is also within the scope of the invention that a suitable sheet may be had of 160 lbs. bases weight—40 x 80 x 40 wherein the two sheets of kraft paper 36 and 37 have a weight of 40 lbs. bases weight. Referring to FIGS. 11 and 14 a relatively flexible sheet 47, 72" high will provide 2—36" high barricades 47a, or 1—72" high barricade 47. This sheet is provided with bands 42 of 12 strands of glass fiber 43 along each longitudinal edge of the sheet material, together with two bands 42' of 12 strands 43 of glass fibers spaced symmetrically 18" from the longitudinal edges of the sheet material and one center band 44 of 24 strands 43 spaced ¼" apart. Two barricades 47a may be formed by slitting along the centerline $S_2$ so that each 36" high barricade 47a will have 12 strands 43 of glass fiber spaced ¼" apart along each longitudinal edge of each barricade and each barricade will have a center band 42' of 12 strands 43 of glass fibers spaced ¼" apart. The diagonal mesh and/or diamond-shaped mesh is formed by the crossed strands 39 and 40. The strands 39 and 40 forming the diamond-shaped mesh have 75 ends—1/0. The overlay for each 36" barricade has 36 strands of glass fiber 150 ends—1/0. The 72" barricade has the overlay of 72 glass strands 43 arranged as illustrated and described, each strand having 150 ends—1/0. A flexible sheet as formed has 140 lbs. bases weight, two 30 lb. kraft sheets are used in the arrangement 30 x 80 x 30. Likewise it is within the scope of the invention to provide a stronger barricade using 40 lbs. kraft paper providing a 160 lb. bases weight—40 x 80 x 40.

Referring to FIGS. 12 and 14, another embodiment of a flexible sheet 48 is illustrated from which the 24" barricade may be formed of which two barricades 48a on opposite edges of the sheet and symmetrically arranged has two bands 42 of 12 strands 43 along each edge of the 2' barricade and a center barricade 48b 2' in height having 2 bands 42 of 12 strands 43 each on each longitudinal edge and a center band 44 having 24 strands 43 spaced ¼" apart. This flexible sheet 43 is also adapted to be divided into two 36" barricades 48b, each barricade having two bands 42 of 12 strands of glass fibers—¼" apart along each longitudinal edge and an offset band 44—24" from opposite edges of the 72" sheet having 24 strands ¼" apart. With this layout it is possible to provide any of the conventional size barricades—2', 3', 4' and 6'. However, one barricade 48a of the 24" barricades is more heavily reinforced and can be used where greater strength is needed and in using the 36" barricade, the band 44" may be placed when erected preferably so that the band is along the bottom edge of the barricade to withstand the most pressure when affixed in place. It is also within the scope of the invention that a band 42' of 12 strands of glass fibers—¼" apart may be symmetrically formed as described with respect to the band 42' of FIG. 10 so that the 24" barricades 48a and 48a' symmetrically positioned with respect to the opposite edges of the sheet 48 will have substantially the same strength as the center 24" barricade 48a' which, however, has an intermediate band 44" with 24 strands of glass fiber ¼" apart as described above.

Referring to FIGS. 13 and 14 there is illustrated another embodiment of flexible sheet material 49, 6' in width which may be suitably fabricated into six 1' barricades 49b each having bands 42 along each longitudinal edge of 12 strands 43 spaced ¼" apart. The sheet 49 may also be fabricated in three 24" barricades 49a each having the longitudinal edge bands 42 of 12 strands 43 of glass fibers spaced as previously described. The sheet 49 may be also fabricated in two 3' barricades 49c with the edge bands 42 and two intermediate bands 44 of 24 strands spaced a foot apart, whereas the 24" band has an intermediate band 44 intermediate the edges thereof. The sheet 49 may also be divided into one 48" barricade 49e having three bands 44 of 24 strands 43 of glass fibers spaced a foot apart and one 24" barricade 49a as previously described. The flexible sheet 49 may be also fabricated into one 5' barricade 49d having four intermediate bands 44 of 24 strands 43 of glass fibers, and one 1' band 49b as illustrated. Since the arrangement of the intermediate bands 44 of 24 strands 43 of glass fibers are spaced 1' apart and are symmetrically arranged, the flexible sheet 49 may be readily fabricated into 1' high barricades by slitting respectively along the slits $S_4$, $S_3$, $S_2$, $S_3$, $S_4$, or 2' high barricades by slitting along the slits $S_3$, 3' high barricades by slitting along the slit $S_2$ and 4' high barricades by slitting along the slit $S_3$ leaving a 2' high barricade and a 5' high barricade by slitting along the slit $S_4$ from either edge of the sheet and leaving a 1' high barricade so that by a single sheet fabricated as described with reference to the flexible sheet 49 of FIG. 13, substantially any size of barricade may be formed within the preferred heights 1', 2', 3', 4', 5' and 6' which is the size of the preferred form of flexible sheet though these may be run is 60" widths, 72" widths as preferred or 84" widths.

Although it is preferred to form the diagonal mesh and/or diamond-shaped mesh of the strands 39 and 40 of 75 ends 1/0 and the horizontal overlay of the machine length strands 43 of 150 ends—1/0, it is also within the scope of the invention that the diagonal mesh may be fabricated from glass fibers within the range of substantially 37 ends—1/0 through 75 ends 1/0, and the longitudinally extending machine length glass fibers 43 within the range of from substantially 75 ends 1/0 through 150 ends 1/0. It is also within the scope of the invention that if additional strength is desired, additional diagonal strands may be similarly placed parallel to the strands 39 and 40 and being spaced as close together as the "Weaver" with a maximum spacing between diagonal fibers of $\frac{1}{32}$ to $\frac{1}{8}$". Referring to FIGS. 9 through 13, the minimum of horizontal strands 43 for sheet 45 is 72, for sheet 46—108 strands, for sheet 47—72 strands, for sheet 48—96 strands, and for sheet 49—144 strands. The range of the kraft sheets 36 and 37 may be within the following weights: 30 lbs., 40 lbs., 50 lbs., 60 lbs., and through a maximum of 100 lbs. though the preferred weight of sheets for the railway car door barricade is preferably 40 lbs. for each sheet 36 and 37. The weight for the fiberglass mesh including the horizontal and diagonal fibers, together with the asphalt is preferably within the range of from 60, 70, 80, 90 and 110 lbs., though the preferred barricade is 40 x 70 x 40—150 lb. bases weight. The tensile strength of a barricade of a double layer of 30 lb. kraft paper with asphalt adhesive and glass fiber reinforcement between the two layers is substantially 105 lbs. per lineal inch of material. It is preferred that the range of strength of the sheet material for barricades be within the range of substantially 105 lbs. per lineal length to, e.g., material which may be used for a grain door or heavier strength barricade consisting of two layers of 50 lb. kraft paper with an asphalt adhesive and glass fiber reinforcement between the two layers such that the resultant paper produces a product having a tensile strength over 200 lbs. per lineal inch of paper. With the flexible sheet material for forming barricades and the like of my invention, the resultant sheet material with the reinforced edge gives a strong crossed direction. In addition to the preferred size of sheet from which the various size of barricades may be made, the sheets may be also fabricated into 18" wide, 36" wide, 54" wide, and the preferred width of 72" wide, and an 84" wide sheet may be also fabricated. With the fibers laid as described along the edges, it is preferred that the tensile strength will be within the range of from 200 lbs. for a substantially 2" wide band of longitudinally extending fibers to substantially 300 lbs. tensile strength for a substantially 3" band of glass fibers. If greater strength of the edge bands of fibers is desired, additional strands of fiber may be laid substantially parallel to each of the 12 fibers originally spaced ¼" a part and the additional fibers may be positioned within 1/32 to 1/8" apart with respect to each original fiber nominally spaced substantially ¼" apart. Although the 40 x 70 x 40 sheet is preferred as described, it is also within the scope of the invention to produce a sheet 40 x 110 x 40. This heavier sheet 190 bases, however, is not satisfactory for cold weather use because of the greater amount of asphalt, though it is within the scope of the invention to use an adhesive which retains its pliability when used as a laminating adhesive in any cold weather which might be encountered in the use of these barricades. Although it is preferred to split the flexible material as fabricated into the widths of the barricade desired, it is also within the scope of the invention that the rolls of these flexible sheets of material as formed may be transported into points of fabrication into the barricade in order to reduce the tariff costs. It is preferred to fabricate the rolls after they have been formed on the apparatus in which the sheets are laminated into lengths of 100 yards for 24", 36", 48" and 72" high barricades. The relative weight of each 300' roll for the different size barricades is respectively, substantially 124 lbs. for a 72" barricade, a 24" barricade substantially 42 lbs., a 36" barricade substantially 62 lbs., and a 48" barricade substantially 84 lbs. In fabricating the reinforced retaining strip from which the barricade is produced, it is preferred to feed relatively flexible sheet material comprising the kraft reinforcing paper applying the asphalt coating 41 to a face of the sheet 37, after which the crossed diagonal mesh substantially 1" x 1" glass fiber and the overlay of the longitudinally extending strands 43 of glass fibers are applied as described above. After which is applied another sheet 36 of kraft reinforcing paper to the asphalt coated kraft reinforcing paper and the asphalt coating with the embedded crossed diagonal mesh of glass fibers and the overlay of longitudinally extending machine length fibers. After the sheets have been through suitable laminating rolls, the sheet is run through embossing rolls for embossing the laminated retaining strips of relatively flexible sheet material to distribute the asphalt coating between the laminated sheets of kraft reinforcing paper so that the embossing causing the flexible sheet material of the retaining strip to be readily flexed. The overlay of longitudinally extending machine length glass fibers 43 for the bands 42, 42' and 44 have been so arranged as described above that the resultant retaining strip is adapted to be slit into one or more retaining strip widths substantially at 2', 3', 4', 5', and 6' widths so that for each width of retaining strip, an overlay of longitudinally extending machine length fibers are formed in each edge of the retaining strip as fabricated from the sheet material and with intermediate reinforcing of the overlay of longitudinally extending machine length glass fibers substantially symmetrically arranged with respect to each of the retaining strips fabricated from sheet material as well as the symmetrical arrangement of the overlay between the edges of the sheet material as fabricated. The resultant flexible sheet material is not only suitable for railway car door barricades but also for back-up strips for wood grain car doors and may be used in disposable grain car doors.

The preferred reinforced flexible sheet material has a 150 lb. bases weight 40 x 70 x 40 of asphalt reinforced kraft paper with a 1" x 1" diagonal mesh and/or diamond-shaped mesh of glass fibers in addition to the overlay of longitudinally extending machine length fibers 43 arranged in the patterns as described above. The resultant 2' wide barricade has the extra reinforcing—3" wide of 12 strands of glass fiber spaced ¼" apart, lengthwise along each edge and down the middle of the barricade. The 3' wide barricade includes the extra reinforcing 3" wide of 12 strands 43 spaced ¼" apart lengthwise along each edge and also down the middle as described with reference to FIG. 11. The 2' wide barricade has been described particularly with reference to FIGS. 9, 10 and embodiments thereof, FIGS. 12 and 13. The 4' wide barricade also has the extra reinforcing 3" wide of 12 strands of glass fibers spaced ¼" apart lengthwise along each edge and also at 12" from each edge together with 24 strands of glass fibers down the middle to permit splitting this 4' flexible sheet of reinforced kraft paper into one 4' barricade and two 2' barricades, as described with reference to FIG. 9.

The 6' wide barricade includes the extra reinforcing 3" wide of 12 strands of glass fibers spaced ¼" apart lengthwise along each edge and at 18" from each edge. Also 6" wide, 24 strands down the middle to permit splitting this 6' sheet of reinforced paper into two 3' barricades or one 6' barricade as described with reference to FIG. 11. It is also within the scope of the invention that a 6' barricade may also be fabricated including the extra reinforcing—3" wide, 12 strands of glass fiber along each edge spaced ¼" apart, and 12" from each edge and down the middle. At 24" from each edge there are 6" of 24 strands of glass fibers spaced ¼" apart to permit splitting this flexible sheet into three 2' wide barricades, or one 4' wide barricade and one 2' wide barricade or one 6' wide barricade as described with reference to FIG. 10. Other variations for fabricating 2', 3' and 6' barricades have been described with reference to FIG. 12 and also described with reference to FIG. 13 for fabricating 1', 2', 3', 4', 5' and 6' barricades as particularly described above with reference to FIG. 13. In all of these embodiments, each longitudinal edge is reinforced with a 3" band of 12 glass strands spaced ¼" apart and are formed with intermediate bands of 3" of 12 strands of glass fiber as illustrated in FIGS. 9, 10, and 11. Also in the embodiments of FIGS. 9 through 13, intermediate bands of 6" wide of 24 strands of glass fiber spaced ¼" apart are formed to permit separation of the flexible sheet along the various slit lines $S_1$, $S_2$, $S_3$, $S_4$ to provide the various sizes of barricades within the range of from 1', 2', 3', 4', 5' and 6' high barricades. All of the preferred embodiments of the reinforced sheet material have the diagonal strands 39 and 40 spaced preferably 1" apart and at an angle of substantially within the range of from 60° to 65° to the longitudinal edge as illustrated in FIG. 14 and schematically in FIGS. 9 through 13.

The different weights of kraft paper forming the outer faces of the barricade meet all the standard tests in testing kraft paper for the preferred weights of sheets as described above. Similarly the fiberglass strands used for the diagonal and/or diamond-shaped mesh and for the overlay of longitudinally extending machine length fibers meet the standard tests for strength of glass fibers within the range of 37 to 75 ends 1/0 and 75 through 150 ends 1/0 for both the diagonal mesh and longitudinally extending machine length glass fibers respectively, and also if other strands within the range of ends 150 and multiples thereof as 300, 450, 600, etc., and likewise if the patterns as described with reference to FIGS. 9–13 of glass fibers are first fabricated into scrim rather than fabricated on a machine of the type known as "Weaver."

Referring to FIGS. 15, 16, 17 and 18, a simple apparatus 50 including a rack 51 and a support means or table 52 is used in the fabrication of the rolls of flexible sheet material into either single barricades 15 and/or divided barricades 23 comprising the portions 25 and 26 of FIGS. 1, 2, 3 and 5 and modified single barricades of FIG. 4. FIG. 15 illustrates the rack for supporting two rolls of paper 53 which may be 4' or 6' wide depending upon the size of barricades desired from 4' or 6' sheets as previously described. Referring to FIG. 16 there is illustrated a rack 51' which is used for supporting rolls of paper 54 2' or 3' wide for fabricating barricades 2' or 3' high. The rack 51' is interchanged with the rack 51 to be used with the supporting means 52 though if production requires it, a similar supporting means 52 may be permanently set up with the rack 51' as illustrated in FIG. 15. The longitudinal edges are formed with two notches 55 for supporting mandrels 56, which extend through the center of the rolls which rotate about the mandrels as the rolls are unwound in the direction of the arrows upon the top of the supporting means or table 52 supported on suitable legs 57.

Referring to FIG. 16, the rack 51' is 55" x 42" x 9" deep and is provided with four sets of notches 55' along the longitudinal edges of the rack. The four notches are substantially for supporting four rolls of paper 2' or 3' wide. Each pair of the rolls 54 unwind in opposite directions to each other as shown by the direction of the arrows, FIG. 16. The rack 51' is supported by similar supports or saw horses 51a' corresponding to the width of the rack.

Referring to FIG. 15, the 4' or 6' wide rolls are unwound on the top 59 to the desired length of sheet to fabricate the different sizes of barricades. The second sheet is also unwound to the length desired and both sheets are cut with a linoleum knife along the cutting edge 60 to the proper size of sheet to fabricate the different lengths of single and divided barricades. For 100" length single barricades, it is preferred to cut the paper 108" long and for the 100" divided barricade to cut the paper into two lengths each 58" long. For 112" length single barricades, it is preferred to cut the paper 120" long and for the 112" length divided barricade, to cut the paper into two lengths each 64" long. For 132" length single barricade it is preferred to cut the paper 140" long and for the 132" length divided barricades, to cut the paper 74" long each length. Other lengths of barricades may be similarly cut and the extra length is similar for both the single and divided barricade for each wrapped end thereof. The sizes of the different lengths of single and divided barricades are the same—whether 1', 2', 3', 4', 5' or 6' wide barricades or other heights of barricades as desired. When the rolls for the smaller 2' or 3' widths of FIG. 16 are unwound, the same procedure is followed as described with reference to FIG. 15 with respect to cutting the different sizes. However, in this case, the rolls are unwound in the direction of the arrow unwinding four sheets which are cut in the same manner in size with a linoleum knife along the cutting edge 60 of the supporting means 52.

Referring to FIGS. 15, 16, 17 and 18, and the enlarged figures—FIGS. 6, 7 and 8 of the divided barricade, the jig 61 of FIG. 17 and 61' of FIG. 18, are used for fabricating the slotted openings 27, 27' and the flaps 28 and 28' for stapling the sections 25 and 26 of the divided barricade together at the overlapped ends 25a and 26a, FIGS. 6, 7 and 8 as described above. The jigs 61 and 61' are fiberboards substantially 48" wide x 12" long x ¼" thick. Used with these jigs 61 and 61' are two steel plates 48" x 10" x ⅛" upon which the ends of the divided barricade/formed with the slotted ends are placed and over which the jigs are placed and the slots 27 cut with a linoleum knife.

Referring to FIG. 17, the jig 61 is provided with four square openings 62, for example, 4" x 4" and placed 6¼" from the widthwise edge C. The first square from the left end A is placed 4" therefrom and each square is 4" apart. This jig 61 is used for 3', 4' and 6' divided barricades. In cutting the 6' barricade the jig is used with the 4" margin and four slots are cut, after which it is turned over widthwise so that the 4" margin lines up with the opposite edge of the flexible sheet paper being formed with the slots and then cut four additional slots, making eight slots in all having a space of 8" between slot No. 4 and slot No. 5. In fabricating a 2' divided barricade cut two slots; for a 3' divided barricade cut four slots; for a 4' divided barricade cut four slots though the jig may be reversed and a fifth slot cut if desired; for a 6' divided barricade cut eight slots, first four from one edge and reversing the jig as described above cut eight slots.

Referring to FIG. 18, the jig 61' is substantially the same as that described with reference to FIG. 17 except that it has five square openings 62'. This jig 61' is used to cut 2', 3', 4' and 6' barricades. This jig is used to cut the slots in 2', 3', 4' and 6' barricades.

In both of these jigs 61 and 61' the slots are cut with a linoleum knife along the edges a and a' and also marked "cut" identifying the cuts for each of the four slots made with the jig 61 and with the five slots used in fabricating 2', 3', 4' and 6' barricades as described above. No cut is made along the edge of the square openings in the jigs 61 and 61' identified with the reference characters b and b', respectively. The three sides of the square are cut along the edges identified a and a', leaving the sides next to the body of the barricade marked by the lower edges of the square b and b', respectively uncut. With the edges of the barricade which are slotted as described above, material being left for wrapping about the chip-board nailing strips which are identified as 20 and 20', FIGS. 6, 7 and 8. The chip-board strips are cut to the length of the respective barricades being fabricated and are stapled together as has been described above with reference to FIGS. 6, 7 and 8.

From the above disclosure, it is evident that there has been disclosed a simple form of retaining strip and/or barricade for a car doorway not requiring the conventional reinforcing steel strapping as of the prior art, but yet has substantially the same strength across the car doorway in retaining packaged carload shipments because of the improved form of reinforced kraft paper construction having the intermediate layer of high strength glass fiber in a crossed diagonal mesh and/or diamond-shaped mesh, together with an overlay of longitudinally extending machine length glass fibers arranged as described with reference to FIGS. 9–14, though it is within the scope of the invention that the reinforced kraft paper may be formed with a scrim sheet with the fibers arranged as described with reference to the same FIGURES 9–14. It is preferred to have the glass fibers in both the diagonal pattern and in the horizontal extending bands as described in the preferred spacing and within the range of spacings with regard to the diagonal mesh such as a 40 x 70 x 40 sheet with the diagonal mesh spaced 1" apart as described. The intermediate layer of the diagonal mesh and horizontally arranged fibers as described above are preferred to be arranged in the particular arrangement of the embodiments described, and in which the strands may be formed of any number of fiber ends preferably in the range of 37 to 75 for the diagonal strands and 75 to 150 ends in the horizontal arrangement. Although the 150 lb. sheet was disclosed as being preferred, it is also within the scope of the invention that sheets of 120 lb.

weight, two by two fiber or 160 lb. weight, two by two glass fiber strands may be used with a spacing preferably of the fiber strands being arranged in the diagonal mesh 1″ apart and in bands of 12 strands ¼″ apart and bands of 24 strands ¼″ apart as described above. It is also possible to use combinations of sheets other than described with reference to FIGS. 9–14, wherein one sheet may be formed with kraft paper and the intermediate layer of glass strands as described and an opposite surface being of cellophane, plastic such as vinyl or other forms of disposable sheet material of relatively high strength. Also, any combinations from one or more sheets may be arranged to produce the required strength, depending upon the load, and this use of multiple sheets is equally permissible not only with the barricade and/or retaining strip construction as described with reference to FIGS. 1 and 5, but is equally adaptable for a separable strip portion of a grain car door construction when it is desired to use multiple sheets rather than the single sheet for bulk car loading in which the weight is over 80,000 lbs., and the widths of the grain car door and the heights thereof are greater than 6′ as disclosed and claimed in my prior U.S. Patent 2,890,747.

There has also been disclosed a preferred form of securing means in the form of staples affixed by clinching staplers, which may be erected on the job or in the factory as the divided barricades are fabricated. The securing means in the form of staples is preferably arranged as illustrated in FIGS. 1, 2, 5, 6, 7 and 8, and the stapling means, as used, permits the opening of the car door without unlatching the divided barricades.

There has also been disclosed a railway car door barricade in both single barricades for use on one side of a car not being loaded and a divided barricade for loading sides from the exterior after the loading is completed. The installation thereof is simple and only requires a hammer, roofing nails, clinching stapler and staples for the erection. Barricades have been disclosed for door openings of 6′ to 15′ in heights of 1, 2, 3, 4, 5 and 6′. With this type of car door barricade, the barricades may be easily broken through and taken out and are completely disposable since there are only a few metal staples. All of the fastening edges are provided with a fiberboard reinforced nailing strip. The slotted openings in the divided barricades provide easy stapling from the outside of the car. The railway car door barricades are preferably formed from kraft paper in which the glass fibers are bonded between two layers preferably of northern kraft paper and are arranged diagonally and horizontally for maximum strength as disclosed with respect to FIGURES 9 through 14.

It is also within the scope of my invention that the divided barricade may be assembled with the slotted ends 25a and 26a extending outwardly and at right angles to the respective sheets 25 and 26 and stapled together as has been described above. This construction (not shown) gives greater center rigidity because of the increased moment of inertia as obtained by the inner ends 20′ wrapped around the chip-board extending outwardly leaving a smooth surface of the divided barricade when stapled together. When erected in this manner, the divided barricade may be assembled, and fixed in place in the car doorway, disassembled for loading and reassembled and stapled together. The slotted holes as described above may still be used for hand holes in holding the ends together and stapling, however, this is unnecessary and the inner ends of the divided barricade may be readily stapled together using conventional clinching staplers. The principal advantage of this arrangement is that no strength is lost in the divided barricade since it may be erected without the slotted openings for the stapler and hands.

It is also within the scope of the invention that pressure-type glues may be used instead of staples both in fabrication of the barricades and in the erection thereof.

The particular form of sheet material as disclosed above for the formation of the barricade is equally applicable for sheet material for grain car door back-up sheets and when used as back-up sheets for wood grain car doors, the horizontal band of reinforcing may be located in the centerlines thereof corresponding to the edges of the standard height of wood grain car door members.

It is also within the scope of this invention that the sheet material as described above for the fabrication of barricades is equally adapted in coopering for lining for car floors and side walls, and when used in this manner the minimum weight of kraft sheets and intermediate layers of glass fibers as disclosed would be preferred.

In describing the fabrication of the single and divided barricades, simple equipment has been described utilizing jigs and simple cutting tools. It is, however, within the scope of the invention that mechanical shears may be used in cutting the sheets from the rolls, suitable slitting mechanism for slitting the sheets at the required widths and also it is within the scope of the invention that indicia lines may be suitably formed on the sheets to indicate the size of sheets which may be severed from the larger size sheet for fabricating the smaller size barricades. Likewise slotting dies for use with presses may be employed preferably for simultaneously slotting several layers of the divided barricades. Also in stapling both in fabrication and in erection, power actuated staplers may be used.

Changes may be made within the scope and spirit of the appended claims which define what is believed to be new and desired to have protected by Letters Patent.

What I claim as new and desire to secure by Letters Patent is:

1. In a barricade for railway cars and the like having doorways of relatively uniform transverse dimensions but in which the space between door post structures may vary in different cars, the combination of a retaining strip of relatively flexible sheet material, said relatively flexible sheet material comprising a kraft reinforcing paper with a woven diagonal mesh of glass fibers arranged at an angle to the opposite edges of and extending across the flexible sheet material forming the restraining strip, and an overlay of longitudinally extending strands of glass fibers, said reinforcing paper being laminated with asphalt and the glass fibers embedded therein, said overlay being arranged in bands of strands which are relatively closely spaced as compared with the spacing between bands of strands, a band of strands of predetermined width being disposed adjacent each corresponding edge of the strip, and at least one intermediate band of substantially twice the width as said first mentioned bands, whereby the sheet can be utilized in its full size or severed at such an intermediate group to divide the latter into two like bands, forming corresponding edge portions of the respective individual barricades so formed.

2. A barricade according to claim 1, wherein, with a sheet material width of 6 units, five like intermediate bands of strands are provided, arranged along lines spaced 1 unit apart and 1 unit from each of said corresponding edges, whereby said sheet, by appropriate severing, can be utilized for one barricade of 6 units, or for any number of barricades of 1 unit or multiples thereof, in which the total number of units is six.

3. A barricade according to claim 1, wherein, with a sheet material width of 4 units, three intermediate bands of strands are provided, arranged along lines spaced 1 unit apart and 1 unit from each of said corresponding edges, the edge and adjacent intermediate bands of strands being of like width, and the center band being of substantially twice the width, whereby said sheet can be utilized for one barricade of units, or by appropriate severing, for two like barricades of two units each.

4. A barricade according to claim 1, wherein, with a sheet material width of 6 units, five intermediate bands of strands are provided, arranged along lines spaced 1 unit apart and 1 unit from each of said corresponding edges, the edge and adjacent bands and the center band being of like width, and the remaining bands having twice the width, whereby said sheet can be utilized for one barricade of 6 units or, by appropriate severing, for three like barricades of 2 units each, or one barricade of 2 units.

5. A barricade according to claim 1, wherein, with a sheet material width of 6 units, three intermediate bands of strands are provided, arranged along lines spaced 2 units apart and 2 units from each of said corresponding edges, the edge and adjacent intermediate bands of strands being of like width, and the center band being of twice the width, whereby said sheet can be utilized for one barricade of 6 units or, by appropriate severing, for two like barricades of three units each.

6. A barricade according to claim 1, wherein, with a sheet material width of 6 units, three intermediate bands of strands are provided, arranged along lines spaced 1 unit apart and 2 units from each of said corresponding edges, whereby said sheet can be utilized for one barricade of 6 units, two like barricades of 3 units, three barricades of 2 units or four barricades comprising two like barricades of 2 units each and two like barricades of 1 unit each.

7. In a divided barricade for railway cars and the like having doorways of relatively uniform transverse dimensions but in which the space between door post structures may vary in different cars, the combination of a retaining strip of relatively flexible sheet material, said relatively flexible sheet material comprising a kraft reinforcing paper with a woven diagonal mesh and an overlay of longitudinally extending strands of glass fibers, said reinforcing paper being laminated with asphalt and the glass fibers embedded therein, a pair of relatively rigid strips about which the separable side edge portions of the retaining strip are wrapped, vertically spaced and oppositely arranged slotted openings contiguous to a vertical inner edge of each wrapped relatively rigid strip of separate retaining strips of the divided barricade, means for securing said separable wrapped edges to said relatively rigid strips, securing means for detachably affixing the wrapped separable edges of the retaining strips together in assembling the barricade to the door post structure of a railway car and permitting separation thereof for loading, said securing means affixed, through the thickness of the abutting contiguous wrapped rigid strips of the separate retaining strips along the respective edges thereof contiguous to the vertically spaced and oppositely arranged slotted openings, enabling inserting of clinching stapling means from the outside of the railway car in affixing the separate retaining strips of the divided barricade together, vertically spaced and operatively arranged slotted openings constructed to permit, after loading of the railway car, insertion of a worker's hand for maintaining the abutting wrapped relatively rigid strips together and under tension during the stapling operation to affix the divided barricade in its reassembled position across the railway car doorway.

8. As an article of manufacture, a barricade for railway cars and the like, having doorways of relatively uniform transverse dimensions but in which the space between door post structures may vary in different cars, said barricade comprising a retaining strip of relatively flexible sheet material including reinforced kraft paper and including a crossed diagonal mesh of glass fibers, and further including extra reinforcing of longitudinally extending machine length glass fibers forming a band of predetermined width along each edge and having a plurality of intermediate bands spaced from each edge, at least one of which is of twice the width as said first mentioned bands to enable utilization of the sheet of paper as one full size barricade or split at a band of twice the width to form a plurality of barricades of smaller size.

9. An article of manufacture according to claim 8, wherein a band of twice the width is centered between said edges.

10. An article of manufacture according to claim 8, wherein a plurality of bands of twice the width are uniformly spaced between said edge bands.

11. An article of manufacture according to claim 9, wherein a band of the same width as the edge bands is disposed between the center band and each edge band.

12. An article of manufacture according to claim 9, wherein a band of twice the width is disposed between the center band and each edge band which are uniformly spaced from the center band.

13. An article of manufacture according to claim 10, wherein a band of the same width as the edge bands is uniformly spaced between each edge band and the adjacent intermediate band, and between adjacent intermediate bands.

References Cited

UNITED STATES PATENTS

| | | | |
|---|---|---|---|
| 912,950 | 2/1909 | Gibert | 161—89 |
| 2,803,299 | 8/1957 | Gerrard et al. | 160—368 |
| 2,890,747 | 6/1959 | Murphy | 160—368 |
| 3,025,908 | 3/1962 | Ford et al. | 160—368 |
| 3,087,536 | 4/1963 | Murphy | 160—368 |

DAVID J. WILLIAMOWSKY, *Primary Examiner.*

HARRISON R. MOSELEY, *Examiner.*

P. C. KANNAN, *Assistant Examiner.*